US011985737B2

(12) United States Patent
Brodin et al.

(10) Patent No.: US 11,985,737 B2
(45) Date of Patent: May 14, 2024

(54) MINERAL-INSULATED SHIELDED CABLE FOR ULTRA HIGH TEMPERATURES, HEATING ELEMENT AND TRANSMISSION CABLE, APPLICATION AND MANUFACTURING METHOD

(71) Applicant: THERMOCOAX, Athis-Val-de-Rouvre (FR)

(72) Inventors: Alexis Brodin, Caen (FR); Denis Lecharpentier, Putanges-le Lac (FR); Viviane Derouet, Athis Val de Rouvre (FR)

(73) Assignee: THERMOCOAC, Athis-Val-de-Rouvre (FR)

( * ) Notice: Subject to any disclaimer, the term of this patent is extended or adjusted under 35 U.S.C. 154(b) by 900 days.

(21) Appl. No.: 16/854,602

(22) Filed: Apr. 21, 2020

(65) Prior Publication Data

US 2021/0251049 A1 Aug. 12, 2021

(30) Foreign Application Priority Data

Feb. 7, 2020 (FR) ...................................... 2001236

(51) Int. Cl.
*H05B 3/56* (2006.01)
*B28B 19/00* (2006.01)
*H05B 3/18* (2006.01)

(52) U.S. Cl.
CPC ............... *H05B 3/56* (2013.01); *B28B 19/00* (2013.01); *H05B 3/18* (2013.01); *H05B 2203/017* (2013.01)

(58) Field of Classification Search
CPC ................ H05B 3/56; H05B 2203/017; H05B 2214/03; H05B 2206/023; H05B 3/42;
(Continued)

(56) References Cited

U.S. PATENT DOCUMENTS 4,679,317 A 7/1987 Bailleul et al.
5,453,599 A * 9/1995 Hall, Jr. .................. H05B 3/42 219/544
(Continued)

FOREIGN PATENT DOCUMENTS

AU 2014280938 A1 1/2015
CN 1555213 A 12/2004
JP H07245175 A 9/1995

OTHER PUBLICATIONS

French Search Report received for Application No. 2001236, dated Dec. 16, 2020.

*Primary Examiner* — Chris Q Liu
(74) *Attorney, Agent, or Firm* — Greer, Burns & Crain, Ltd

(57) ABSTRACT

An ultra high temperature mineral-insulated shielded cabled is provided as a non-sintered compacted powder, where central conductors and/or a sheath are made of a conducting material selected from tantalum, tungsten, rhodium, rhenium, carbon, and a mixture of at least two of such materials. The mineral insulator is made of an insulating material selected from boron nitride, yttrium oxide, silicon nitride, aluminium nitride, and a mixture of such materials. The conductor is tantalum and the insulator is selected from hafnia, boron nitride, silicon nitride, and a mixture of such materials, in particular for a use at a temperature lower than 1 630° C. or 1 600° C.; or aluminium nitride, in particular at a temperature lower than 1 530° C. or 1 500° C. A device including this cable used below 1800° C., particularly under 1 600° C., in particular under vacuum, as a heating element or transmission cable.

16 Claims, 2 Drawing Sheets

(58) Field of Classification Search
CPC ........ H05B 2203/021; H05B 2203/022; H05B 2203/037; H05B 3/06; H05B 3/12; H05B 3/145; H05B 3/18; H05B 3/48; H05B 6/108
USPC ................ 219/546, 538, 544, 548, 552, 553
See application file for complete search history.

(56) References Cited

U.S. PATENT DOCUMENTS

| | | | | |
|---|---|---|---|---|
| 6,119,922 | A * | 9/2000 | Hall, Jr. | B03C 1/12 228/148 |
| 6,300,571 | B1 | 10/2001 | Scannell et al. | |
| 6,501,366 | B2 * | 12/2002 | Takahashi | G01K 7/22 374/185 |
| 2005/0002818 | A1 * | 1/2005 | Ichikawa | H10N 10/817 419/6 |
| 2011/0132661 | A1 * | 6/2011 | Harmason | H01R 4/70 29/857 |
| 2013/0087383 | A1 * | 4/2013 | Herrera | E21B 36/04 29/869 |
| 2015/0237679 | A1 * | 8/2015 | Parman | H05B 3/56 219/546 |
| 2016/0380414 | A1 * | 12/2016 | Harmason | H02G 1/005 29/869 |

* cited by examiner

MINERAL-INSULATED SHIELDED CABLE FOR ULTRA HIGH TEMPERATURES, HEATING ELEMENT AND TRANSMISSION CABLE, APPLICATION AND MANUFACTURING METHOD

BACKGROUND

The invention relates to an ultra high temperature mineral-insulated shielded cable as a non-sintered compacted powder, where central conductors and/or sheath are made of a conducting material selected from tantalum, tungsten, rhodium, rhenium, carbon, and a mixture of at least two of said materials.

The invention provides a device comprising this cable used below 1800° C., particularly under 1 600° C., in particular under vacuum, as a heating element or transmission cable. In particular, as a heating cable at 1 600° C. over 180 cycles, for a cathode of an ion thruster.

The invention provides a device comprising this cable used below 1 700° C., particularly under 1 550° C., in particular under vacuum, as a heating element or transmission cable. In particular, as a heating cable at 1 500° C. over at least 500 cycles, for a cathode of an ion thruster.

The mineral-insulated shielded cable is used to make, in particular, sensors, heating elements and signal transmission cables; in numerous fields where such components are subjected to harsh environments, especially in terms of temperature.

Such a cable typically consists of one or more conductors, surrounded by an insulator thickness as a compacted mineral powder. The assembly is enclosed into a sealed sheath of metal. The assembly provides a cable which is sufficiently ductile to be able to be shaped, and installed into locations according to various and uneven shapes. It generally keeps some strength, which enables it to keep its given shape.

However, the strength in a harsh environment, and therefore also the performance in the case of a heating cable, remain limited by properties of used metals and insulators. Presently, the highest withstood temperatures are, depending on the designs, in the order of 1 200° C. to 1 400° C. For example, 1 200° C. for a standard composition formed by a conductor of nickel-chromium, with a magnesia MgO insulator and an inconel 600 sheath.

However, it is still useful to be able to make a mineral insulator cable apt to withstand very high temperatures, including a harsh environment, for example under vacuum. For example, to perform heating at a higher temperature, or for direct measurements of very hot environments, or to be able to get it closer to such environments such as for example for a better resistance to faults or accidents.

In particular, in the field of electric heating, it is useful to make heating elements which are used in spatial systems, for example to heat a catalyst in a thruster with a monopropellant, such as hydrazine.

In the case of so-called ultra high temperatures, for example higher than 1 400° C., for example to trigger gas ionisation in a plasma spatial thruster, a conventional method is to use an electric arc to heat this gas.

Alternatively, it is known to use heating resistors which preheat a hollow cathode to bring it to a temperature enabling a thermionic emission, in order to bring a propelling gas to a plasma state, the temperature of the cathode being generally subsequently maintained by the plasma itself.

Such heating elements are generally made as bare conductors, suspended or fastened to a ceramic support.

The publication "Design and Thermal Analysis of the Insert Region Heater of a Lanthanum Hexaboride Hollow Cathode" by Ozturk et al., 2013 IEEE p. 607, also provides a digital simulation of an architecture in which a heating mineral-insulated cable is wound around this cathode. But the temperatures involved are higher than operating temperatures of the existing cables of this type and in such an environment. It is thereby useful to manage to make such a mineral-insulated cable able to provide this temperature and withstand the same during a sufficient operational life service, while enjoying advantages of shielded cables, namely the conductors and the insulator are protected from the outside environment and do not interact with it (for example degassing) and are more easily mechanically integrable (for example by welding).

One purpose of the invention is to overcome all or part of the drawbacks of the state of the art.

In particular, it is attempted to have better strength and/or heating performance, a higher service temperature, for mineral-insulated shielded cables, while optimising compactness and/or resistance, as well as the manufacturing, use and/or maintenance simplicity and flexibility.

In particular, within this scope, it is also attempted to improve heating devices used in spatial systems.

SUMMARY

Although the basic architecture of the mineral-insulated shielded cable has been known and employed for a long time, technical choices made by the inventors make it possible to improve the performance which can be reached in terms of temperature resistance, in particular in a vacuum environment.

Among numerous materials theoretically known materials for their high temperature resistance, the inventors have made choices which are specific to the constraints of the targeted architecture, and have made numerous practical tests to check whether they were adapted and under which conditions.

In particular, they attempted to check whether electric behaviour of these materials, taken individually or within this architecture, remained effective and operational at targeted temperatures. A series of choices has thus been made to select insulators the resistivity of which remained sufficient to fulfil this function at a high temperature.

From these choices, cables using these different materials have been actually manufactured, with characteristics close to those of an industrial manufacture, to check a practical operation thereof. Yet, it turned out that many of these cables had operation faults at temperatures much lower than those the physico-chemical nature of the used materials should have allowed.

In a new research phase, faults which occurred in real conditions have been analysed to identify causes thereof. It thereby appeared that certain pairs of materials, constituting the insulator and the conductor within such a cable, had interactions which were detrimental to their combined operation within a same cable.

New tests have then been performed to test specific insulator-conductor combinations, on the one hand in a simplified architecture as a model and on the other hand as a cable in an operational architecture. New choices of materials have then been made, providing a range of cable types enabling high temperatures in a vacuum environment to be reached.

Specific tests have also been performed to test the life service of such cables, in particular in terms of number of heating cycles. The inventors have thus determined fields of use enabling a determined service life in a repeated use and in a determined temperature range to be obtained.

The mineral insulator is made of an insulating material selected from hafnium oxide, boron nitride, yttrium oxide, silicon nitride, aluminium nitride, and a mixture of said materials.

According to various optional features, the conductor is of tantalum and the insulator is selected from hafnia, boron nitride, silicon nitride, and a mixture of said materials, in particular for use at a temperature lower than 1 630° C. or 1 600° C.; or aluminium nitride, in particular for a temperature lower than 1 530° C. or 1 500° C.

Mineral-Insulated Shielded Cable

The invention provides a mineral-insulated shielded cable, comprising one or more so-called central conductors, surrounded by at least one mineral insulator layer as a compacted powder, the assembly being enclosed into a sheath formed by a ductile sealed material, at least at the manufacturing and installation temperatures. When there are several conductors, they are for example separated by the insulator, and for example disposed parallel or wound in several interleaved turns. They are for example connected in parallel or series, for example in a manner known in the field of heating shielded cables.

According to the invention, said central conductors and said sheath are each made at least at 80%, in particular at least 90% and more particularly at least 99% by mass, of a determined conducting material selected from tantalum, tungsten, rhodium, rhenium, carbon, and a mixture of at least two of these materials. This mixture is for example a mixture of two, three, or four of these materials. Within each of said central conductors and the sheath, it is thus provided to have such a determined conducting material in a proportion of 80% to 100%, advantageously 90% to 100%, in particular 99% to 100%. Preferably, but not necessarily, the central conductors and the sheath are all formed of the same determined conducting material, or of different conducting materials but having the same components in different proportions.

Furthermore, according to the invention, said mineral insulator is made, by at least 80%, in particular by at least 90%; and more particularly by at least 99% (there can be 80 to 100%, advantageously 90 to 100%, in particular 99 to 100%), of a determined insulating material selected from boron nitride, yttrium oxide, silicon nitride, aluminium nitride, and a mixture of at least two of these materials. This mixture is for example a mixture of two, three, or four, or five of these materials. Within said mineral insulator, it is thus provided to have such a determined insulating material in a proportion of 80% to 100%, advantageously 90% to 100%, in particular 99% to 100%.

Optionally, the list of materials herein disclosed to make the insulator also includes hafnium oxide, according to the same ranges of proportions and/or mixtures.

According to one optional feature, one or more of the central conductors and the sheath, and for example all of them, are made of a metal obtained by melting, in particular under vacuum, for example tantalum.

According to another optional feature, one or more of the central conductors and the sheath, and for example all of them, are made of an at least 99.95% pure metal, for example tantalum.

According to a preferred embodiment, the mineral insulator comprises at least 90% of boron nitride, in particular at least 99% and more particularly at least 99.9% by mass, and the central conductors and the sheath of the cable each comprise at least 90%, in particular at least 99% and more particularly at least 99.9%, of a material selected from:

tantalum,
rhodium,
tungsten,
rhenium,
carbon, and
a mixture of at least two of these materials.

According to another embodiment, the mineral insulator comprises at least 90% of silicon nitride, in particular at least 99% and more particularly at least 99.9% by mass, and the central conductors and the sheath of the cable each comprise at least 90%, in particular at least 99% and more particularly at least 99.9%, of a material selected from:

tantalum,
rhodium,
tungsten,
rhenium,
carbon, and
a mixture of at least two of these materials.

According to an alternative option, the mineral insulator comprises at least 90% of hafnium oxide, in particular at least 99% and more particularly at least 99.9% by mass. The central conductors and the sheath of the cable then each comprise at least 90%, in particular at least 99% and more particularly at least 99.9%, of a material selected from:

tantalum,
rhodium,
tungsten,
rhenium,
carbon, and
a mixture of at least two of these materials.

According to one optional feature, for embodiments using one or more carbon conductors, this or these conductors are surrounded by at least one mineral insulator layer as a compacted powder, which can be a powder consisting of simple particles or short fibres. The assembly is enclosed into a flexible sheath of an especially refractory and ductile, and preferably metal sealed material. This powder is preferably compacted but not sintered, that is keeping a freedom of movement for the grains with respect to each other. The central conductor is thus formed of carbon in its entirety, or partly and for example by portions succeeding to each other along the length. It is typically formed in whole or in part of graphite, and especially of a composition predominantly of graphite.

Optionally, the step of preparing the blank comprises preparing the at least one central conductor by inserting its powder into a sheath, which sheath is surrounded by the mineral insulator, especially a silica braid.

Alternatively, or in combination, the step of preparing the blank comprises preparing one or more central conductors as a rod formed by a mixture comprising the powder of said central conductor and a binder, said binder being of a type selected to be degraded and/or evaporated by heat during a subsequent heating step within said manufacturing method.

Typically, this rod is obtained by cold extrusion of the mixture comprising the powder and binder.

According to one optional feature, it is provided to make the central conductor(s) of carbon whereas the sheath is made of another of the conducting materials herein provided.

According to one embodiment, the central conductor of the cable comprises only one wire (typically obtained from a wire or pipe, linear or coiled, typically coaxial to the sheath), in particular with a diameter higher than 0.1 mm, in particular higher than 0.5 mm, and/or with a diameter lower than 5 mm, in particular lower than 3 mm and more particularly lower than 1 mm.

According to this embodiment, the external diameter of the cable is lower than 5 mm, in particular lower than 3 mm and more particularly lower than 2.4 mm; and/or is higher than 0.5 mm, in particular higher than 1 mm and more particularly higher than 2 mm. It is for example equal to 2.3 mm.

According to one embodiment, the central conductor of the cable comprises several wires (insulated from each other or not), for example parallel to each other or coiled about a longitudinal axis of said cable.

According to another aspect, the invention provides a device comprising a cable such as previously set out, which is arranged to operate under conditions in which said cable is brought to a so-called operational temperature which is higher than 1 200° C. and in particular higher than 1 300° C. or than 1 370° C.

Such a device is for example arranged for an operational temperature which is lower than 1 830°, in particular lower than 1 800° C., more particularly lower than 1 630° C. and in particular lower than 1 600° C.

However, the invention also provides such a device for which the operational temperature is more than 1 600° C., for example up to 1 800° C. or 1 830° C., or up to 1 900° C. or 1 930° C.

For example, in the case of a device where said cable is used as a heating cable, it can be a device which is arranged so that the power supply to the heating cable is controlled so as to produce a temperature corresponding to this operational temperature.

For example, in such a device where said cable is used in a passive way, for example as a sensor or for signal transmission, it can be a device which is provided so that this cable is exposed to a temperature corresponding to this operational temperature.

According to one optional feature, this device is of a type arranged to operate under vacuum representing a pressure lower than $10^{-2}$ Pa, in particular lower than $10^{-3}$ Pa (or $10^{-4}$ mbar), and more particularly lower than $2.10^{-4}$ Pa (or $2.10^{-6}$ mbar).

According to one embodiment of such a device, the cable is of the previously set out type especially with a boron nitride insulator (or hafnium oxide), and the device is arranged to operate under conditions in which said cable is brought to a so-called operational temperature which is higher than 1 470° C., and in particular higher than 1 500° C. This device is for example arranged to operate with an operational temperature which is lower than 1 630° C. and in particular lower than 1600° C.

According to one optional feature of this embodiment, the device is then arranged to operate, during a so-called operational life service of said cable, under conditions where the cable is likely to undergo a plurality of temperature variation cycles, between at least the operational temperature and a so-called standby temperature which is lower than 500° C. and more particularly lower than 250° C. This operational service life, for example a guaranteed minimum service life, is defined by a number of cycles following which said cable has to remain operational (at the minimum).

It is for example higher than 50 cycles, and in particular higher than 100 cycles, and for example higher than or equal to 180 cycles. For example, this device is arranged and provided to use said cable during an operational service life which is lower than 200 cycles, in particular lower than 180 cycles, and more particularly lower than 150 cycles.

According to one embodiment of such a device, the cable is of the previously set out type, especially with a boron nitride or silicon nitride (or hafnium oxide) insulator, and the device is arranged to operate under conditions in which said cable is brought to a so-called operational temperature which is lower than 1 530° C. and in particular lower than 1 500° C.

According to one optional feature of this embodiment, the device is then arranged to operate, during a so-called operational service life of said cable, under conditions in which the cable is likely to undergo a plurality of temperature variation cycles, between at least the operational temperature and at least a so-called standby temperature which is lower than 500° C. and more particularly lower than 250° C. This operational service life, for example a guaranteed minimum service life, is defined by a number of cycles following which said cable has to remain operational (at the minimum). It is for example higher than 200 cycles, and in particular higher than 300 cycles, and can also be higher than 400 cycles or even 450 cycles, and for example higher than or equal to 500 cycles.

According to another example, this device is arranged and provided to use said cable during an operational life service which is higher than 1 000 cycles, in particular higher than 1 800 cycles, and in particular higher than 2 000 cycles; and/or which is lower than 2 000 cycles, and in particular lower than or equal to 1 500 cycles, and more particularly lower than 700 cycles or even 600 cycles.

Used as a Heating Element

According to a family of embodiments of such a device, said device is arranged to make a heating element that works by flowing an electric intensity within the central element(s) of the cable.

According to one optional feature of this embodiment, this device is arranged to heat an ionising electrode through contact heating, for example a thermionic emission, within an electric type spatial or aeronautical thruster. It can be in particular a thruster of the ion engine type and in particular with grids or with a Hall effect, for example as usable for orbit trimming or a long term propulsion.

Used for Signal Transmission

According to another family of embodiments of such a device, said device is arranged to carry an electric or electromagnetic signal in a high temperature environment.

Generally speaking, such an UHT (Ultra High Temperature) cable can be used and installed similarly to existing mineral-insulated cables, while being capable of a performance and vacuum resistance at a higher temperature.

The mineral-insulated shielded cable can be fastened or not to a support. It can be held for example by caulking into a housing, crimping, welding, brazing, or soldering or any other method adapted to the application.

Manufacturing Method

According yet to another aspect, the invention provides a method for manufacturing a mineral-insulated shielded cable such as previously set out. According to the invention, this method comprises the following steps of:

- preparing a blank having an initial external diameter, and comprising:
  - the central conductor(s), as metal wires or pipes (for example obtained by melting, especially under vacuum, or other method),
  - the mineral insulator layer(s), as a powder surrounding said central conductors, (for example prepared and assembled as a pearl, that is an agglomerated and bound powder to form a friable solid, and
  - the sheath;
- one or more reduction passes, produced by hammering (preferably) or wire drawing, arranged to reduce the external diameter of said cable down to a final diameter lower than the initial diameter, and produce compacting of powders included in said cable.

According to one optional feature, said method comprises a step of annealing, especially under vacuum.

According to another optional feature, which can be combined with the previous one, said method comprises at least one prior step of calcinating the powder material(s) making the mineral insulator, at a temperature higher than 500° C., in particular higher than 890° C., and for example higher than 900° C., for a duration higher than 10 min and in particular between 15 min and 90 min.

According to one embodiment of such a cable comprising one or more carbon conductors, the step of preparing the blank comprises preparing the carbon central conductor(s) by inserting its powder into a sheath, which sheath is surrounded by the mineral insulator, especially a silica braid.

Alternatively, or in combination, the step of preparing the carbon blank comprises preparing one or more of the central conductor(s) as rods formed by a mixture comprising the powder of said central conductor and a binder. This binder is then of a type selected to be degraded and/or evaporated by heat during a subsequent heating step within said manufacturing method, for example during an annealing step.

Typically, this rod is obtained by cold extruding the mixture comprising the powder and binder.

Making such a mineral-insulated shielded cable with a conductor carbon is for example described in application no FR1910630, of the same applicants and not yet published.

Various embodiments of the invention are provided, integrating the different optional characteristics herein disclosed according to all their possible combinations.

BRIEF DESCRIPTION OF THE DRAWINGS

Further features and advantages of the invention will appear from the detailed description of an implementation in no way limiting, and the appended drawings in which.

DETAILED DESCRIPTION

Figure 1:
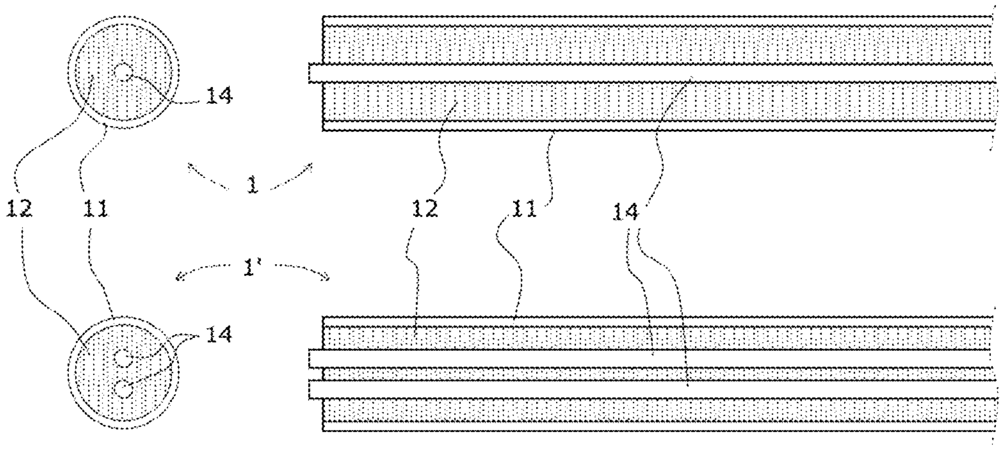
FIG. 1 is a transverse and a longitudinal cross-section schematic views, which illustrate two exemplary structures of a mineral-insulated shielded cable according to the invention.

FIG. 1 illustrates two conventional exemplary structures of a mineral-insulated shielded cable in which the cable according to the invention can be implemented.

Such a cable 1, 1' comprises one (cable 1) or several (cable 1') so-called central conductors 14, surrounded by at least one mineral insulator layer 12 as a compacted powder, the assembly being enclosed into a ductile sheath 11 of a sealed material.

Insulation Resistance Tests, According to the Temperature

Numerous mineral-insulated shielded cables have been manufactured, and tested by mounting them as heating devices.

Tests performed are herein described, in a non-exhaustive way, which have been carried out with the following materials:

- Insulators: Alumina (Al2O3), Magnesia (MgO), Boron nitride (BN), Silicon nitride (Si3N4), Aluminium nitride (AlN), Hafnia, Spinel, Yttria; and
- Conducting material(s) and/or sheath(es): Tantalum, Tungsten, alloyed tungsten, Rhodium, Rhenium Tantalum used in these tests is more than 99.95% pure, obtained by vacuum melting.

Manufacturing Procedure

Tests have been conducted with different combinations of these materials for the cable elements: insulator, conductors, sheath.

In a so-called "pearl" configuration, the conductor is a wire coiled around a solid insulator core, and surrounded by a solid insulator pipe. The solid insulator is in a so-called "pearl" form, that is solid but friable, generally obtained by extrusion or isostatic pressing, and machining. This kind of form is typically used to make the blank which will then be used to make the complete cable. The pearl then disintegrates through deformation during reduction passes, to transform into a compacted powder in the final cable.

In a so-called "cable" configuration, the mineral-insulated shielded cable is entirely mounted and brought to its final diameter.

The cable used here is a single-conductor cable. The blank is formed being assembled via a wire or pipe which will form the conductor, inserted into the hole of an insulator pearl or into the insulator powder, which insulator being itself surrounded by a pipe which will form the sheath. The blank subsequently undergoes several hammering or wire drawing passes followed or not by annealing passes, until the desired final diameter is obtained.

Powders are all calcinated at 600° C. Annealing passes are made under 100% Argon.

Blanks have been measured and weighed before reduction, which implies that compaction rates can be determined.

For tantalum cables, these cables are made with a grade of tantalum more than 99.95% pure, obtained by vacuum melting.

A blank is obtained which is therefore particularly ductile and conducive to hammering. The wire has a diameter of 0.508 mm, and the pipe a diameter of 3.175/2.413 mm). The tested cable has a final diameter of 2 mm.

Due to the large ductility of tantalum, it is contemplated to be able to go further below this diameter.

Ri=f(T) measurements have been made in an oven, for the temperature range from 600° C. to 1 000° C., with 3 m cables and more stable results are obtained.

Material Combination Tests

These Cables are Subsequently Tested as Heating Cables, by Rising the temperature thereof.

Test 3: Ta—MgO

A MgO and tantalum combination has been tested as a cable. Indeed, it is Magnesia which provides the highest hot insulation.

However, the test was not conclusive, the cable stopped operating whereas the temperature had not exceeded 1 300° C. An analysis of the out of service heating element showed that a eutectic type reaction occurred between tantalum and magnesia. This was confirmed by scanning electron microscope analyses.

Test 4: Ta—HfO2 Pearl

A test was carried out with a bare tantalum wire, wound around a perforated Ø2.75 hafnia pearl. The assembly is brought to 1 600° C. with temperature gradients.

The test is raised up to 1 600° C., and the tantalum wire is still ductile at the end of the test. However, it was nearly no longer in contact with hafnia since the pearl was reduced in diameter to 0.5 mm, that is 18%, in all likelihood by sintering/melting or change of phase. After research, it would seem that hafnia has a change of phase from 1 650° C.

Thus, cables associating hafnia as an insulator with tantalum as a conductor and sheath have enabled an operational temperature of 1 500° C., or even 1 600° C.

Test 5: Ta—BN Cable: Maximum Temperature Rise Test.

A single-wire cable associating tantalum and BN (boron nitride). A heating test is performed under vacuum up to 1 900° C., but a short-circuit terminated the test, with a significant vacuum loss (degassing) occurring from 1 850° C.

A radiography is performed on the cable in proximity to the suspected fracture, which shows a sharp fracture of the core. The cable is actually highly breakable, with a typical pattern of a brittle fracture.

A resistance up to 1 800° C., or even 1 850° C. is observed, but with a short-circuit at 1 900° C.

Test 6: Ta—BN Pearl: Temperature Rise Test at 1 850° C.

A gradual temperature rise test is performed with a tantalum wire coiled around a BN pearl and then covered with another BN pearl.

At the end of this test, the BN chuck pearl is black and the turns are all grey and breakable. The pattern is still shiny, typical of a brittle fracture. It has been therefore demonstrated that there is a reaction with boron nitride at 1 900° C. and which is not related to the cable configuration.

It is furthermore noticed that the vacuum level is quite stable below 1 800° C. on the wire (cf. transition temperature) and highly disturbed beyond, without exceeding $5.10^{-4}$ m bar. There may be continuous micro degassing which happen during the tantalum/BN reaction. It does not seem to be here a sublimation or eutectic which would cause something abrupt and not gradual as here. May be a chemical reaction or diffusion.

It therefore seems that the Ta—BN combination is able to rise up to 1 800° C., or even 1 850° C., but it can have limits due to embrittlement of tantalum.

Test 7: Ta—BN Pearl: Temperature Resistance Test at 1 500° C. (1 h)

The test is repeated but this time at 1 500° C. during 1 h, and then the ductility of tantalum is manually observed.

At the end of the test, tantalum is still ductile. The association of tantalum with boron nitride is therefore operational up to 1 500° C.

Due to the ductility being kept, similar life service features to those known for usual heating temperatures, up to 1 500° C., can be reasonably expected.

Test 8 First Part: Ta—BN Pearl: Temperature Resistance Test at 1 600° C. (1 h)

The test repeated at 1 600° C. during 1 h. Quantified results are similar, but tantalum is brittle at the end of the test.

The maximum use temperature of tantalum with boron nitride is between 1 500° C. and 1 600° C. to keep a ductile state thereto.

Tantalum thus seems to react with BN between 1 500° C. and 1 600° C., which causes its embrittlement, but remains operational from an electric point of view.

Test 8 Second Part: Ta—BN Cable: Temperature Resistance Test at 1 600° C. (1 h) and then Cycling Tests are then resumed with the same cable type at a temperature lower than the initial 1 900° C., to assess its possibilities in terms of life service, under situations of use with several temperature rises.

A tantalum+BN single-wire cable with non-contiguous turns has been made with the previously tested BN powder. The cable was supplied to reach 1 600° C. during 1 h, with a prior 1 h-step at 1 000° C. At the end of this test, the cable proves ductile when handled.

This same cable has been subsequently cyclically supplied, between 1 600° C. and 200° C., to be ON during 7 min at 1 600° C. and OFF back to 200° C.

It is noticed that the cable has a life service higher than 180 cycles, between 200° C. and 1 600° C.

Test 9: Ta—Si3NO4 Cable: Temperature Rise Test

A test associating tantalum and silicon nitride Si3N4 has been performed. The cable made is coiled with 015 mm non-contiguous turns. The turns did not collapse at 1 600° C. and the temperature was homogeneous over the whole coiled part.

The heating element remained operational in its temperature rise up to 1 600° C., but could only operate during 30 min at this temperature. Upon examination, it is observed that the core melted over several mm inside the cable and created a discontinuity. While straightening the turn, it broke clean with a shiny pattern characteristic of tantalum embrittlement.

This combination is therefore capable of being possibly operational at a temperature lower than or equal to 1 600° C., but with a life service limited over time.

Test 10: Rhodium+BN Pearl: Temperature Rise Test

A test is performed with boron nitride (BN) associated with Rhodium, in a pearl type configuration.

The temperature rise halted at 1 650° C., due to a discontinuity. In the same time, the vacuum was broken, probably due to a sudden degassing. The continuity fault comes from the wire melting right in the middle with suspicions of vaporisation/sublimation at this vacuum rate (sudden vacuum loss).

Yet, on theoretical vaporisation curves, it can be seen that between 1 and $5.10^{-5}$ mbar rhodium is vaporised between 1 850° C. and 1 900° C.

It is therefore possible that the measurement at 1 650° C. within the BN pearls (via C-type bare wires) and at 1 625° C. at the surface of the outer BN pearl (via a pyrometer) substantially reduce temperature of the heating wire.

Thus, the discontinuity is probably produced by a real temperature of the conductor around 1 850° C., due to a temperature gradient and/or a contact fault.

This combination therefore seems operational below 1 600° C., or even above up to 1 800° C.

Figure 2:
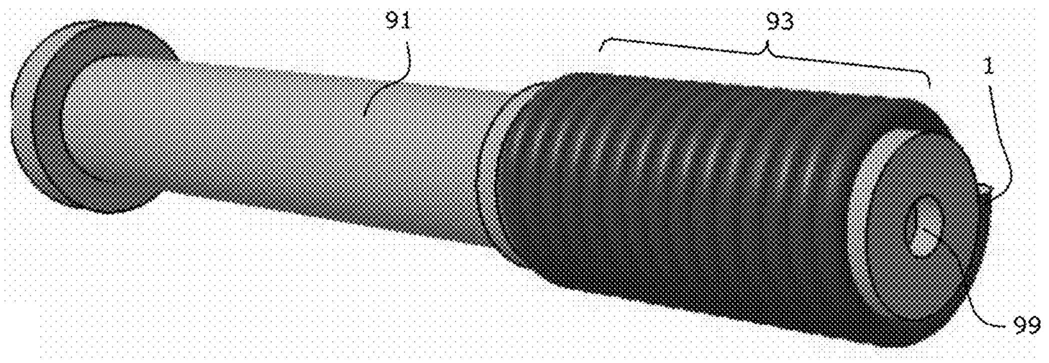
FIG. 2 is a perspective view of an ionising hollow cathode carrying a mineral-insulated shielded cable winding according to the invention, mounted as a heating cable.
Figure 3:
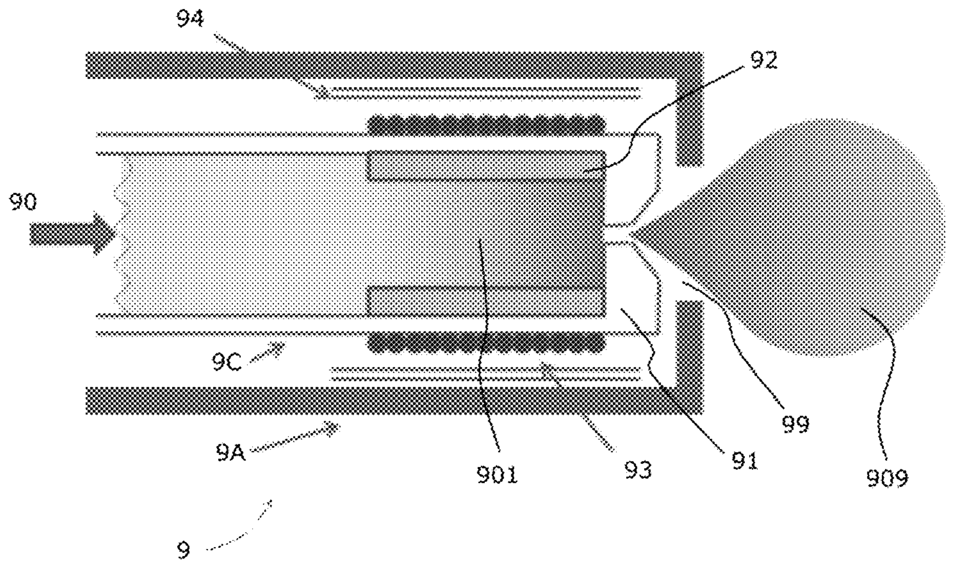
FIG. 3 is a longitudinal cross-section schematic view of the implementation of the heating cathode of FIG. 2, within a plasma ion thruster.

Example of Application: Preheating of Ionising Hollow Cathode for Producing Plasma on Spatial Thruster FIG. 2 and FIG. 3 illustrate an exemplary embodiment of the invention, in which the cable is mounted as a heating element within an ion engine type thruster in a spatial system, for example of the ion engine type and in particular with grids or Hall effect.

In this example, the heating cable 1 is wound 93 around a hollow cathode 9C, and is controlled to preheat said cathode in order to enable gas ionisation under the effect of an electric field created between this cathode 9C and an anode 9A, for example the outside pipe which surrounds the cathode.

When ignited, the cathode is heated by the cable up to the temperature which will allow it to produce thermionic emission. The propelling gas 90 is injected through a supply, here on the left of the figure, and transforms into plasma 901 inside the cathode 9C. This plasma is then accelerated towards anode 9A, and escapes therefrom to outside through the central hole 99 as a propelling jet 909.

In continuous operation, the temperature of the cathode 9C is maintained by the plasma itself. The heating cable 1 is here used to preheat the cathode, which allows such a spatial thruster to be ignited. This cathode is for example of the BaO—W (for example "barium-oxide impregnated tungsten"), or LaB6 ("lanthanum-hexaboride") insert 92 type.

By enabling a heating cable operating at higher temperatures and under vacuum to be made, the invention makes it possible to perform this preheating by a resistor made in the form of a mineral-insulated shielded cable 1. In comparison with a bare-wire resistor, this form enables an easier and more reliable implementation, as well as a better robustness to take-off constraints, and a better protection against contacts with the environment of the device or even with external elements which could penetrate thereinto.

Of course, the invention is not limited to the examples just described and numerous arrangements can be brought to these examples without departing from the scope of the invention.

The invention claimed is:

1. A mineral-insulated shielded cable, comprising: one or more central conductors, surrounded by at least one mineral insulator layer as a compacted powder, said one or more central conductors and said at least one mineral insulator layer being enclosed into a ductile sheath of a sealed material;

wherein said central conductors and said sheath are each made with at least 80% of a material selected from tantalum, tungsten, rhodium, rhenium, carbon, and a mixture of at least two of these materials; and wherein each said mineral insulator layer is made, with at least 80% of a material selected from boron nitride, yttrium oxide, silicon nitride, aluminum nitride, and a mixture of at least two of these materials.

2. The cable of claim 1, wherein one or more of the central conductors and the sheath are made of metal obtained by melting, in particular vacuum melting.

3. The cable of claim 2, wherein at least one of the one or more central conductors and the sheath is made of at least 99.95% pure metal.

4. The cable of claim 1, wherein the mineral insulator layer comprises at least 90% by mass of boron nitride, and wherein the one or more central conductors and the sheath of the cable each comprise at least 90% of a material selected from:

tantalum, rhodium, tungsten, rhenium, carbon, and a mixture of at least two of these materials.

5. The cable of claim 1, wherein the mineral insulator layer comprises at least 90% by mass of silicon nitride, and wherein the one or more central conductors and the sheath of the cable each comprise at least 90% of a material selected from:

tantalum, rhodium, tungsten, rhenium, carbon, and a mixture of at least two of these materials.

6. A device comprising the cable of claim 5, wherein said device is arranged to operate under conditions where the cable is brought to an operational temperature which is lower than 1530° C.

7. The device of claim 6, wherein said device is arranged to operate under conditions where the cable undergoes a plurality of temperature variation cycles, between at least the operational temperature and at least a standby temperature which is lower than 500°, during an operational life service of said cable, defined by a number of cycles following which said cable has to remain operational to the minimum, said life service being greater than 200 cycles.

8. The cable of 1, wherein the central conductor of said cable comprises only one wire with a diameter larger than 0.1 mm and with a diameter smaller than 5 mm, and wherein an external diameter of the cable is smaller than 5 mm and is larger than 0.5 mm.

9. A device comprising a mineral-insulated shielded cable, comprising: one or more central conductors, surrounded by at least one mineral insulator layer as a compacted powder, said one or more central conductors and said at least one mineral insulator layer being enclosed into a ductile sheath of a sealed material;

wherein said central conductors and said sheath are each made with at least 80% of a material selected from tantalum, tungsten, rhodium, rhenium, carbon, and a mixture of at least two of these materials, wherein each said mineral insulator layer is made, with at least 80% of a material selected from boron nitride, yttrium oxide, silicon nitride, aluminum nitride, and a mixture of at least two of these materials, wherein said device is arranged to operate under conditions where said cable is brought to an operational temperature which is higher than 1200° C., and which is lower than 1830° C.

10. The device of claim 9, wherein said device is arranged to operate under conditions where the cable is brought to an operational temperature which is higher than 1470° C., and which is lower than 1630° C.

11. The device of claim 10, wherein said device is arranged to operate under conditions where the cable undergoes a plurality of temperature variation cycles, between at least the operational temperature and at least a standby temperature which is lower than 500° C., during an operational life service of said cable, defined by a number of cycles following which said cable has to remain operational, said life service being greater than 50 cycles.

12. The device of claim 9, wherein said device is arranged to operate under a vacuum being a pressure lower than $10^{-2}$ Pa.

13. The device of claim 9, wherein said device is arranged to make a heating element operated by flowing an electric intensity within the central element(s) of the cable.

14. The device of claim 13, wherein said device is arranged to produce a contact heating of an ionisation electrode within an electric type spatial or aeronautic thruster.

15. The device of claim 13, wherein the cable is wound around a hollow cathode and in that the device is arranged to preheat said cathode so as to allow gas ionization during the ignition of a self-heating spatial ion thruster.

16. The device of claim 9, wherein said device is arranged to carry an electric or electromagnetic signal in a high temperature environment.

* * * * *